(12) United States Patent
Park

(10) Patent No.: US 9,790,401 B2
(45) Date of Patent: Oct. 17, 2017

(54) ABRASIVE PARTICLES, POLISHING SLURRY AND METHOD OF FABRICATING ABRASIVE PARTICLES

(71) Applicant: UBMATERIALS INC., Yongin-Si, Gyeonggi-Do (KR)

(72) Inventor: Jin Hyung Park, Seongnam-Si (KR)

(73) Assignee: UBMATERIALS INC. (KR)

( * ) Notice: Subject to any disclaimer, the term of this patent is extended or adjusted under 35 U.S.C. 154(b) by 0 days.

(21) Appl. No.: 15/095,008

(22) Filed: Apr. 8, 2016

(65) Prior Publication Data
US 2017/0002233 A1    Jan. 5, 2017

(30) Foreign Application Priority Data
Jun. 30, 2015  (KR) .......................... 10-2015-0093420

(51) Int. Cl.
C09G 1/02     (2006.01)
C01F 17/00    (2006.01)
C09K 3/14     (2006.01)

(52) U.S. Cl.
CPC ............ *C09G 1/02* (2013.01); *C01F 17/0043* (2013.01); *C09K 3/1454* (2013.01); *C01P 2004/51* (2013.01)

(58) Field of Classification Search
CPC ...... C09G 1/02; C01F 17/0043; C09K 3/1454
See application file for complete search history.

(56) References Cited

U.S. PATENT DOCUMENTS

| | | | |
|---|---|---|---|
| 6,221,118 B1 | 4/2001 | Yoshida et al. | |
| 6,343,976 B1 | 2/2002 | Yoshida et al. | |
| 2002/0086618 A1* | 7/2002 | Ota | B82Y 30/00 451/41 |
| 2010/0003897 A1* | 1/2010 | Kim | C09G 1/02 451/41 |

FOREIGN PATENT DOCUMENTS

| | | |
|---|---|---|
| CN | 101608097 A | 12/2009 |
| JP | 5855334 A | 4/1983 |
| JP | 200327045 A | 1/2003 |
| JP | 2003514744 A | 4/2003 |
| JP | 2005170775 A | 6/2005 |
| JP | 2005519845 A | 7/2005 |
| JP | 2006249129 A | 9/2006 |
| JP | 201036187 A | 2/2010 |
| JP | 2010505735 A | 2/2010 |
| JP | 2012500764 A | 1/2012 |
| KR | 20150030592 A | 3/2015 |
| KR | 20150042322 A | 4/2015 |

* cited by examiner

*Primary Examiner* — Duy Deo
(74) *Attorney, Agent, or Firm* — Renaissance IP Law Group LLP

(57) ABSTRACT

The present disclosure relates to abrasive particles, a polishing slurry and a fabricating method of the abrasive particles. The fabricating method of abrasive particles in accordance with an exemplary embodiment of the present disclosure includes preparing a precursor solution in which a first precursor is mixed with a second precursor that is different from the first precursor, preparing a basic solution, mixing the basic solution with the precursor solution and forming a precipitate, and washing abrasive particles synthesized by precipitation.

13 Claims, 3 Drawing Sheets

FIG. 5

| | Abrasive Particles | | pH | Polishing Amount of $SiO_2$ [Å] | Scratch | | | |
|---|---|---|---|---|---|---|---|---|
| | Average Particle Diameter | Content [wt%] | | | Smallest Size [μm] | Largest Size [μm] | Average Size [μm] | Number [ea/cm$^2$] |
| Experimental Example | 5 nm | 1 | 6 | 797.3 | 7.88 | 552.12 | 243.03 | 52 |
| Comparative Example 1 | 20 nm | | | | 30.91 | 1531.51 | 340.23 | 149 |
| Comparative Example 2 | 40 nm | | | | 26.36 | 1716.36 | 627.27 | 280 |
| Comparative Example 3 | 70 nm | | | | 55.76 | 2046.67 | 673.13 | 507 |

ABRASIVE PARTICLES, POLISHING SLURRY AND METHOD OF FABRICATING ABRASIVE PARTICLES

CROSS-REFERENCE TO RELATED APPLICATION

This application claims priority to Korean Patent Application No. 10-2015-0093420 filed on Jun. 30, 2015 and all the benefits accruing therefrom under 35 U.S.C. §119, the contents of which are incorporated by reference in their entirety.

BACKGROUND

The present disclosure relates to abrasive particles and a polishing slurry, and more particularly, to abrasive particles and a polishing slurry which can be used in the manufacturing process of semiconductors for chemical mechanical polishing to planarize dielectric layers, and to a method of fabricating the abrasive particles.

Chemical mechanical polishing (CMP) process is carried out by applying a slurry containing abrasive particles on a workpiece, and rotating a polishing pad attached to a polishing apparatus. The abrasive particles then mechanically polish the surface of the workpiece, while chemical substances contained in the slurry chemically reacts with the surface, thereby chemically removing the surface of the workpiece. Examples of such abrasive particles include silica ($SiO_2$), ceria ($CeO_2$), alumina ($Al_2O_3$), and titanium oxides ($TiO_2$), and can be selectively used depending on a type of the workpiece.

On the other hand, in the manufacturing process of the NAND flash memory devices of fine design rules (for example, 19 or 16 nm), Shallow Trench Isolation (STI) process and CMP process are used. Here, the CMP process involves polishing a dielectric layer, namely a silicon dioxide layer, until a polysilicon layer is exposed. Also, in the manufacturing process of application processor (AP) of fine design rules (for example, 14 nm), silicon or silicon-germanium field effect transistors (FET) are manufactured, and the CMP process is used. Here, the CMP process involves polishing a dielectric layer, namely, a silicon dioxide layer, until a nitride layer is exposed.

The above CMP process involves polishing silicon oxide layers while having polysilicon layers or nitride layers as the polishing or etching stop layers, and utilizes the abrasive particles suitable for such uses. For example, ceria is used as the abrasive particles, and ceria can be fabricated by a dry process or a wet process. The dry-process ceria particles, due to constraints associated with the fabricating process, have crystal grains in an angular shape and a wide particle size distribution that inevitably lead to micro-scratches at the polishing stop layers when applied for the CMP process. On the other hand, the wet-process ceria particles have a narrow size distribution without larger particles of a secondary particle size, and have a poly-hedral structure, thus can lessen the occurrence of micro-scratches compared to the conventional dry-process ceria particles. However, the wet-process ceria particles are difficult to fabricate, and the problem of generating micro-scratches due to the sharp facets of its poly-hedral structure has not been resolved.

Also, as the design rule of various devices mentioned above decreases, the devices become more vulnerable to polishing scratches, damage, and the like. However, the ceria abrasive particles until now have a size of a few tens of nanometers and are poly-hedral shaped with sharp facets of the polyhedron. Consequently, the ceria abrasive particles continue to contribute to the problems of generating scratches, abrasions and pits on the surfaces of various devices being polished, or etching stop layers.

In U.S. Pat. No. 6,221,118 and No. 6,343,976, a method of forming ceria abrasive particles and a method of polishing wafers using the same are disclosed.

RELATED ART DOCUMENTS

U.S. Pat. No. 6,221,118
U.S. Pat. No. 6,343,976

SUMMARY

The present disclosure provides abrasive particles, a polishing slurry and a method of fabricating abrasive particles.

The present disclosure also provides abrasive particles and a polishing slurry that can suppress or prevent polishing scratches from occurring, and a method of fabricating abrasive particles.

In accordance with an exemplary embodiment, a method of fabricating abrasive particles includes preparing a precursor solution in which a first precursor is mixed with a second precursor that is different from the first precursor; preparing a basic solution; mixing the basic solution with the precursor solution and forming a precipitate; and washing abrasive particles synthesized by precipitation.

The first precursor may include an organic salt containing a cerium (III), the second precursor may include an inorganic salt containing the cerium (III), and the second precursor may include a halogen group element.

The preparing the precursor solution may include mixing the first precursor with water to prepare a first precursor solution; mixing the second precursor with water to prepare a second precursor solution; and mixing the first precursor solution with the second precursor solution. Also, the first precursor solution may be a solution having a pH value lower than that of the second precursor solution.

The preparing the precursor solution may further include adding an acidic material to the second precursor solution prior to the mixing the first precursor solution with the second precursor solution. The mixing the first precursor solution with the second precursor solution may include adjusting a mixing ratio of the first precursor solution to the second precursor solution in a range of 1:1 to 1:5.

The forming the precipitate may be maintained at a pH value of 8 to 10.

Adjusting the pH of the mixture solution to an acidic range may be further included after forming the precipitate. Also, stirring a mixture solution of the basic solution and the precursor solution may be included prior to adjusting the pH to an acidic range.

The first precursor may include at least one of cerium acetate, cerium carbonate, and cerium oxalate, and the second precursor may include at least one of cerium chloride, cerium bromide, cerium iodide, cerium sulfate, and cerium nitrate.

The forming the precipitate is carried out at a room temperature, and after the precipitate, no additional thermal treatment is carried out. That is, the synthesis of the precipitate may be a non-thermal process involving no heating.

The synthesized abrasive particles may have an average particle diameter in a range of 2 nm to 10 nm, and the synthesized abrasive particles may include ceria particles.

In accordance with an exemplary embodiment, abrasive particles for polishing a workspace, the abrasive particles being synthesized from two or more different precursors, and being crystalline include cerium, and have an average particle diameter in the range of 2 nm to 10 nm. The particles may be single-crystalline, and may have a round-shape, and the particles may have an average particle diameter in a range of 3 nm or greater and less than 6 nm.

In accordance with another exemplary embodiment, a polishing slurry for polishing a workspace includes abrasive particles which performs polishing, are synthesized from two or more different precursors, are crystalline, include cerium, and have an average diameter in a range of 2 nm to 10 nm; and deionized water in which the abrasive particles are distributed. The abrasive particles may be single-crystalline, and may have a round-shape. Also, the polishing slurry may further include a pH adjustment agent that adjusts pH.

BRIEF DESCRIPTION OF THE DRAWINGS

Exemplary embodiments can be understood in more detail from the following description taken in conjunction with the accompanying drawings, in which:

FIG. 5 is a table showing the results of polishing performance on dielectric layers, using the abrasive particles in accordance with an embodiment and related art abrasive particles.

DETAILED DESCRIPTION OF EMBODIMENTS

Figure 1:
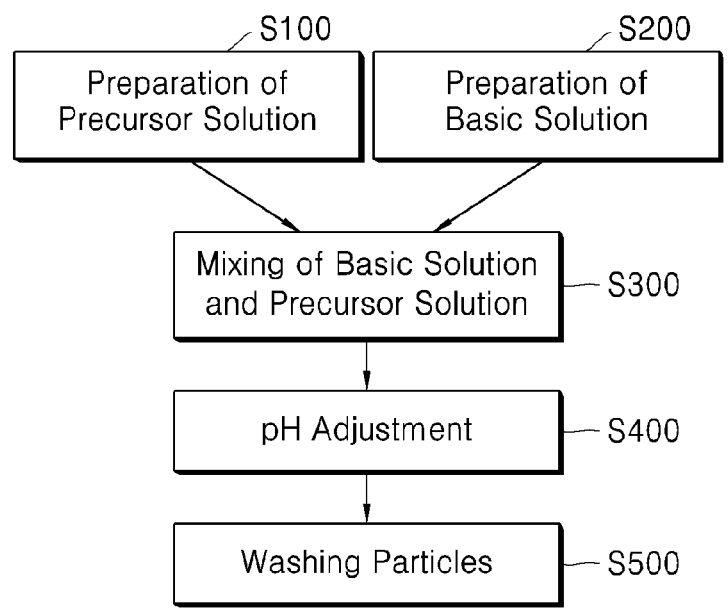
FIG. 1 is a flowchart of processes for fabricating abrasive particles in accordance with an embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of elements may be exaggerated for clarity of illustration. Like reference numerals refer to like elements throughout.

Figure 2:
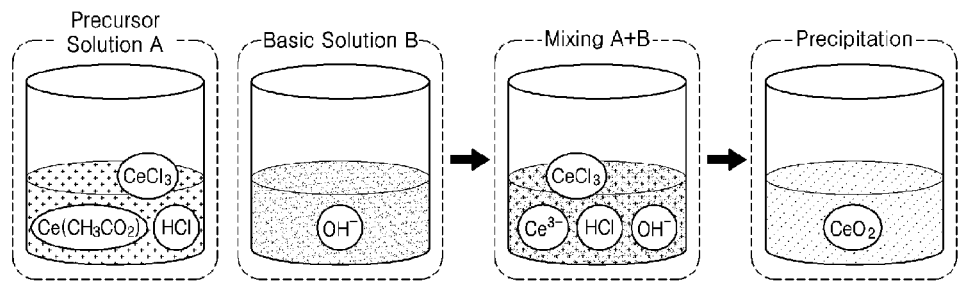
FIG. 2 is a conceptual diagram conceptually illustrating the fabricating process of FIG. 1.
Figure 3:
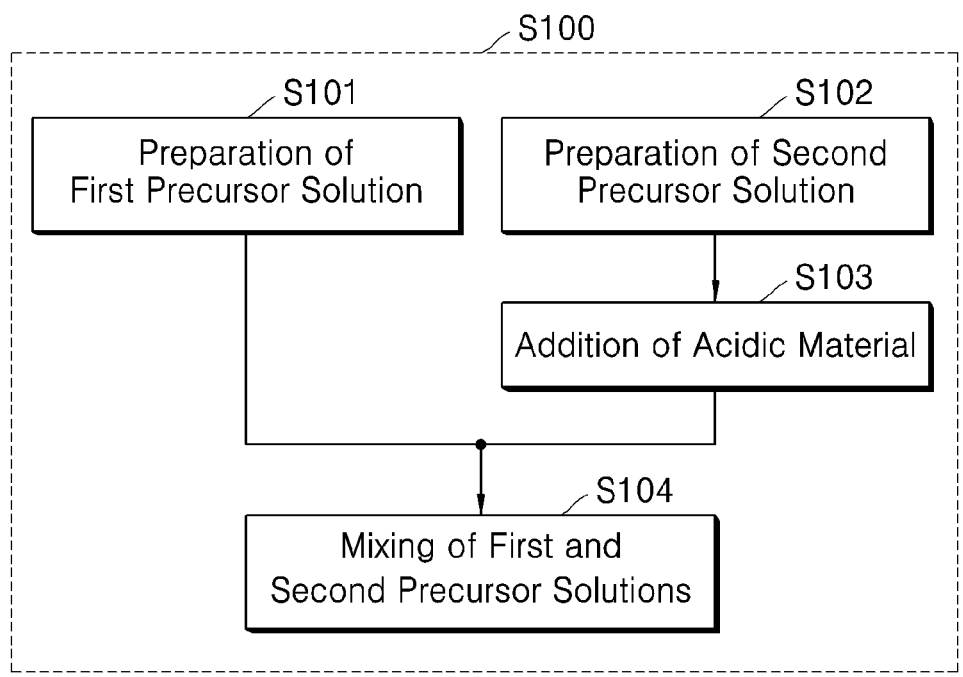
FIG. 3 is a detailed flowchart of part of the flowchart of FIG. 1.

FIG. 1 is a flowchart of processes for fabricating abrasive particles in accordance with an embodiment, FIG. 2 is a conceptual diagram conceptually showing the process of FIG. 1, and FIG. 3 is a detailed flowchart of part of the flowchart of FIG. 1.

The fabricating method of abrasive particles in accordance with an embodiment includes preparing a precursor solution in which a first precursor is combined with a second precursor that is different from the first precursor (S100); preparing a basic solution (S200); mixing the basic solution with the precursor solution and forming a precipitate (S300); and washing abrasive particles synthesized by precipitation (S400). Here, preparing the precursor solution (S100) and preparing the basic solution (S200) may be carried out in any order, so long as they are prepared before mixing of the two solutions.

First, preparing the precursor solution (S100) involves preparing a solution that contains two or more precursors having different compositions. Here, the precursors having different composition are main materials of abrasive particles, having in common a component that constitutes the abrasive particles, however, they are different from each other in terms of overall composition and physical properties. For example, when synthesizing cerium dioxide particles, the precursors may be salts, all of which contain cerium (Ce) but are different in terms of physical properties. In other words, the first precursor may include an organic salt containing cerium (III), whereas the second precursor may include an inorganic salt containing cerium (III). Also, the first precursor may be more acidic than the second precursor, and the second precursor may include a halogen Group element. Halogen Group elements are elements of Group 17 of the Periodic Table and include fluorine, chlorine, bromine, iodine. These elements react with alkali metals to form typical salts that readily dissolve in water and look similar to a common table salt. Halogen elements are the most reactive and non-metallic of the families, and therefore, usually exist in the compounds with other elements. For preparing ceria ($CeO_2$) particles, examples of the precursor are as follows. The first precursor may include at least one of cerium (III) acetate ($Ce(CH_3CO_2)_3$), cerium carbonate ($Ce_2(CO3)_3$), and cerium oxalate ($Ce_2(C_2O_4)_3$). The second precursor may include at least one of cerium (III) chloride ($C_eCl_3$), cerium bromide ($CeBr_3$), cerium iodide ($CeI_3$), cerium sulfate ($Ce_2(SO_4)_3$), and cerium nitrate ($Ce(NO_3)_3$). When preparing the precursor solution, at least one of the first and second precursors mentioned above is selected, and dissolved in water and prepared as a solution. Thus, the precursor solution can be prepared with various combinations of the precursors.

Hereinafter, preparing the precursor solution is discussed in detail. As shown in FIG. 3, preparing the precursor solution (S100) includes, mixing the first precursor with water to prepare the first precursor solution (S101); mixing the second precursor with water to prepare the second precursor solution (S102); and mixing the first precursor solution with the second precursor solution (S104). For example, the first precursor solution may be prepared using cerium acetate as the first precursor and dissolving the cerium acetate in deionized water, and the second precursor solution may be prepared using cerium chloride as the second precursor and dissolving the cerium chloride in deionized water. At this point, the mixing ratio of cerium acetate to deionized water may be controlled in a predetermined range. The weight ratio of cerium acetate to deionized water may be adjusted in a range of 1:1 or greater and less than 1:30. Also, after introducing cerium acetate in deionized water, the resulting solution may be rotated at a speed of 200 to 400 rpm, for 5 to 10 minutes, thereby mixing the precursor with deionized water. For the second precursor solution, the weight ratio of cerium chloride to deionized water may be adjusted in a range of 1:5 or greater and less than 1:50. Also, after adding cerium chloride to deionized water, the resulting solution may be mixed by rotating at a speed of 200 to 400 rpm, for 5 to 10 minutes.

The thusly-prepared first precursor solution exhibits a lower hydrogen ion concentration index (pH) than that of the second precursor solution. In this case, preparing the precursor solution (S100) may further include adding an acidic material to the second precursor solution (S103) prior to mixing the first precursor solution with the second precursor solution (S104). That is, in the cerium chloride solution in which cerium chloride is dissolved, an acidic material such as hydrochloride acid, acetic acid, sulfuric acid and nitric acid may be introduced to control the pH thereof. For example, the ratio of hydrochloric acid to cerium chloride solution may be adjusted in a range of 1:1 to 1:10, and the solution having the adjusted ratio may be mixed by rotating for about 5 minutes. Cerium chloride has cerium (III), however, outside an appropriately acidic range of pH, cerium (III) may transform or oxidize to cerium (IV). Accordingly, the pH is adjusted so as to maintain the cerium (III) stably in the second precursor solution. Also, an addition of an acidic material may increase the solubility of cerium chloride inside the second precursor solution. At this point, the pH of the second precursor solution may be adjusted to be almost identical or similar to the pH of the first precursor solution. The pH value of the solution is adjusted in a range of 1 to 4. When the pH value rises to 5 or higher, cerium salt is less likely to remain as the cerium (III) salt but more likely to oxidize to the cerium (IV) salt, and since it is difficult to control the amount of the cerium (III) transforming into the cerium (IV) consistently, a sufficient amount of the cerium (III) salt may not be supplied into the solution. When the cerium (III) salt transforms into the cerium (IV) salt, the cerium (IV) salt also becomes a starting point of particle growth, and thus it becomes difficult to control a particle size distribution of the final ceria particles, and to obtain the ceria particles having a relatively uniform particle size in a range of 2 to 10 nm, or 3 to 6 nm.

In mixing the first precursor solution with the second precursor solution (S104), the mixing may be carried out in any suitable manner, and accordingly, for example, the solutions are placed into a large container and stirred to uniform consistency. At this point, the mixing ratio of the first and the second precursor solutions may be suitably controlled. That is, the mixing ratio of the first precursor solution to the second precursor solution may be adjusted to a range of 1:1 to 1:5. If the amount of cerium chloride is increased in an attempt to synthesize a larger amount of the ceria particles, the amount of hydrochloric acid that is to be added to the cerium chloride solution also increases. However, if the amount of hydrochloric acid increases, the pH of the cerium chloride solution may drop below 2. Cerium chloride solution with a pH value so low as the above rapidly lowers the pH of a basic solution (for example, pH=12) which later gets mixed with for precipitation, and consequently falls outside a pH range that needs to be maintained at the time of precipitation. In this regard, by mixing the cerium chloride solution with a cerium acetate solution, and adjusting a mixing ratio of the precursor solutions to the ranges mentioned above, it is possible to obtain the abrasive particles being synthesized in a sufficient amount, and reduce the amount of an acidic compound used for the cerium chloride solution (the second precursor solution).

Preparing the basic solution (S200) includes mixing a basic compound such as ammonia with deionized water. For example, a container is placed inside a reactor, and $N_2$ was flown into the reactor to create an inert atmosphere, and deionized water and ammonia are added to the container at a ratio of 1:1 to 1:10 by weight. Also, the thusly-prepared solution can be mixed for 1 hour or less to produce the basic solution. The pH of the basic solution at this point is adjusted to approximately 12.

As shown in FIG. 2, the precursor solution (A) and the basic solution (B) are mixed (S300) once they are prepared. The precursor solution (A) and the basic solution (B) may be mixed in any suitable manner, and for example, the precursor solution (A) may be introduced gradually in the basic solution (B). As the precursor solution is introduced in the basic solution, a precipitate starts to be formed. Various reactive species and radicals present in the mixture solution (A+B), including cerium ions react to form a precipitate of abrasive particles (ceria). At this point, to maintain the pH value of the mixture solution (A+B) within a predetermined range, the precursor solution (A) is sufficiently slowly added to the basic solution (B). That is, the addition of the precursor solution (A) may be carried out gradually over a period of 1 to 4 hours, while maintaining the pH value of the solution (A+B) in a range of 8 to 10. Largely, the temperature and the pH control are considered to be the factors which control the growth of ceria abrasive particles being synthesized. In the case of conventional ceria particles of a few tens of nanometers, the ceria particles are grown through raising the temperature (for example, 85° C.). However, the ultra-fine ceria particles in accordance with the present embodiment are synthesized at a room temperature without raising the synthesis temperature. Here, if the cerium solution is mixed and left at a room temperature for a long time without controlling the temperature, ceria particles may grow up to about 10 nm, which may result in a size distribution of the ceria particles falling outside the desirable range. Therefore, in order to obtain ultra-fine ceria particles in a uniform size range (for example, from 3 to 6 nm) without elevating the temperature, the growth of the particles needs to be controlled, and to this end, the pH is adjusted to a predetermined range. That is, when synthesizing the particles, adjusting the pH value from 8 to 10 can suppress, or prevent the particle distribution getting unduly affected and the particles growing larger than 10 nm. Once the addition of the precursor solution is completed, the mixture solution (A+B) is mixed to uniform consistency. For example, the mixture solution may be stirred at a stirring speed of 500 to 800 rpm, and under an inert atmosphere for about 5 minutes to 1 hour.

Once the solutions are mixed and precipitates are formed, the pH of the mixture solution may be adjusted to an acidic range by using a pH-adjusting agent (S400). If the pH of the mixture solution is adjusted to an acidic range, the side reactions among free-floating or residual chemical species present in the mixture solution can be suppressed. In other words, by adjusting the pH, the occurrence of various reactions among the residual species, or the chemical species that did not participate in the formation of the abrasive particles, which may lead to the formation of undesired products, can be suppressed or prevented. At this point, the pH value of the solution may be adjusted at 4 or below. Alternatively, adjusting the pH to suppress the side reactions may not be carried out.

Once all the reactions are completed, the mixture solution is filtered to obtain abrasive particles, and the obtained abrasive particles are washed (S500). For example, the solution containing a precipitate of the abrasive particles is filtered using a membrane filter having a pore size of 1 to 7 KDa (Kilo Dalton), and washed a few times with deionized water. Optionally, the abrasive particles may be re-dispersed using deionized water. That is, a deionized water solution containing a predetermined amount of the abrasive particles can be obtained.

Also, the processes of fabricating the abrasive particles discussed above, including forming a precipitate of the abrasive particles, are carried out at a room temperature, or a little lower temperature than the room temperature and no additional thermal treatment is conducted once the abrasive particles are formed. Here, the room temperature refers to an indoor temperature that is not being particularly controlled, and for example, it may be in the range of 10 to 30° C., or 18 to 25° C. In accordance with an embodiment, abrasive particles with excellent crystallinity can be obtained without conducting an additional thermal treatment such as heating and calcination.

The fabricating method of abrasive particles discussed above may be applied to a variety of compounds. That is to say, the method may be used to fabricate abrasive particles of various oxides other than ceria.

Figure 4:
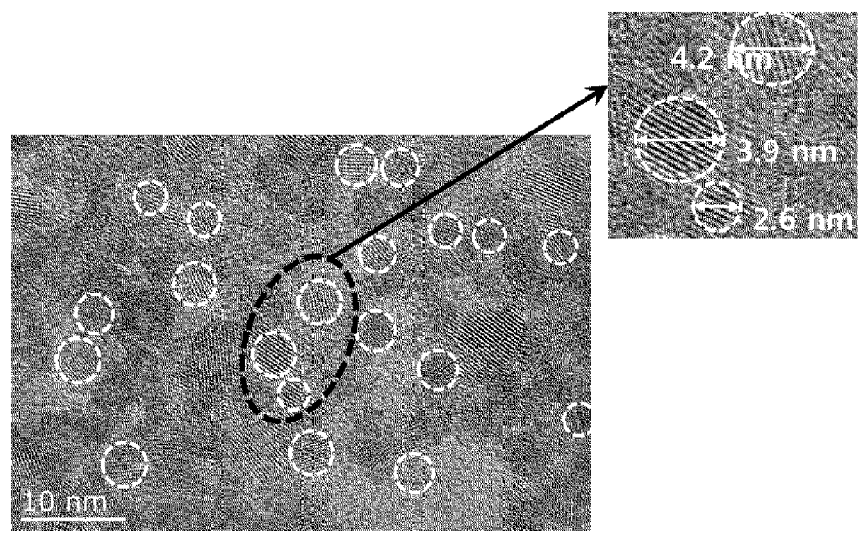
FIG. 4 is an electron microscope photograph of abrasive particles prepared as an embodiment.

The abrasive particles in accordance with an exemplary embodiment are discussed below. FIG. 4 is a transmission electron microscope (TEM) photograph of abrasive particles prepared as an embodiment.

As discussed above, the abrasive particles are synthesized from two or more different precursors, and the synthesized abrasive particles are crystalline, and have an average particle diameter in a range of 2 nm to 10 nm. That is, the abrasive particles may be ultra-fine particles having a size of a few nanometers, having an average diameter of less than 10 nm, unlike conventional ones having a size of a few tens of nanometers. Also, the abrasive particles may have an average particle diameter in a range of 3 nm or more and less than 6 nm. The abrasive particles may be oxidized cerium, that is, ceria particles. Referring to FIG. 4, the abrasive particles are shown to be single-crystalline and round-shaped, having a particle diameter of less than 10 nm.

As the abrasive particles get bigger, the mechanical, that is, physical aspect of chemical mechanical polishing (CMP) therewith have more influences on the polishing rate and polishing scratches. In other words, as the size of the abrasive particles gets larger, the polishing rate increases proportionally, but the polishing scratches also increase exponentially, which greatly affects the device yield. On the other hand, as the size of abrasive particles gets smaller than 10 nm, the polishing relies more on its chemical aspect than the mechanical one. Accordingly, if the ultra-fine particles having a size of less than 10 nm are used when making the slurries, it is possible to increase the polishing rate suitably to achieve the polishing objective, and it is also possible to increase the selectivity of the etching stop layers and the layers to be polished. Also, it is possible to reduce the occurrence of polishing scratches, and thereby increase the device yield.

In general, regardless of the fabricating method, the related art ceria particles exhibit a different growth rate depending on the direction of the crystal growth. For example, the growth rates are different depending upon a direction of the planes such as {100}, {110}, and {111}, and due to such differences, the particles take a poly-hedral shape with sharp facets. On the other hand, with the ceria abrasive particles in accordance with an embodiment that are fabricated using two different precursors, it is possible to control the growth rates of different directions to be almost identical, which means that the isotropic growth can be achieved. Accordingly, it is possible to obtain the abrasive particles that have not only a single-crystalline structure but also an almost spherical round shape. Also, due to its rapid nucleation rate, the fine particles can be synthesized rapidly by a precipitation method.

A slurry prepared using the conventional poly-hedral shaped ceria particles of a size of a few tens of nanometers, when utilized for polishing dielectric layers, due to the sharp facets, contribute to a number of scratches, deforming or creating pits on the layers being polished. On the other hand, the abrasive particles in accordance with an embodiment do not exhibit sharp facets and are fine in size, therefore can smoothly polish the layers being polished, rarely generating scratches, and without deforming or creating pits on the layers being polished. Also, even in the rare event of scratches, their size is small enough to minimize an adverse effect on the devices being manufactured.

Hereinafter, a slurry prepared using the abrasive particles is discussed. The slurry in accordance with an embodiment is a slurry that polishes a workpiece and including abrasive particles synthesized from two or more different precursors, and deionized water in which the abrasive particles are distributed. The abrasive particles are discussed in sufficient detail in the above, therefore will not be repeated. The slurry using ceria ($CeO_2$) as the abrasive particles are oftentimes utilized to polish dielectric layers such as silicon dioxide layers.

The abrasive particles may be contained in a content of 0.1 to 10 wt % of the total weight of the slurry. Alternatively, the abrasive particles may be contained in a content of 0.5 to 5 wt % of the total weight of the slurry. If the content of the abrasive particles is so low as less than 0.1 wt %, a sufficient polishing of the dielectric layers may not be achieved, and if the content of the abrasive particles is so high as to exceed 10 wt % of the total weight of the slurry, the polishing rate may become so high that the dielectric layers or polishing stop layers may be over-polished.

Deionized water is added in order to adjust the content of ceria particles, namely, the solids content required for polishing. For example, if a solution containing 10 wt % of ceria particles is obtained following the synthesis, and the content of the ceria particles required for polishing is 5 wt %, then deionized water may be added to dilute the solution from 10 wt % to 5 wt %.

To the polishing slurry, a pH-adjusting agent that adjusts the pH may be added. For example, by introducing acidic (such as nitric acid) or basic compounds, the pH value of the slurry may be adjusted in a range of 3 to 14. Alternatively, the pH value of the slurry may be adjusted in a range of 4 to 8. If the pH value of the slurry is below 4, it is likely to adversely affect a dispersion stability of the slurry, whereas if the pH value of the slurry is above 8, due to strong basicity, the polishing rate of polishing-stop layers, for example, polysilicon layers, may drastically increase. Also, various chemical compounds other than those discussed above may be optionally added to the polishing slurry if need be, or to effect desired characteristics.

Hereinafter, the results of polishing characteristics of the abrasive particles and slurries in accordance with the embodiments when applied to semiconductor wafers are discussed.

Experimental Examples and Comparative Examples

Since the abrasive particles of Experimental Examples are by and large prepared according to the fabricating method discussed above, their preparation will only be discussed briefly hereinafter. First, cerium (III-1) aqueous solution was prepared by mixing 33.4 g of cerium (III-1) salt with 100 g of deionized water. Cerium (III-2) aqueous solution was prepared by mixing 8.99 g of cerium (III-2) salt with 100 g of deionized water. Cerium acetate for the cerium (III-1) salt, and cerium chloride for the cerium (III-2) salt were used. The pH of the cerium (III-2) aqueous solution was controlled by introducing 36.67 g of hydrochloric acid into the cerium (III-2) aqueous solution. Then, the cerium (III-1) aqueous solution was mixed with the cerium (III-2) aqueous solution mixed with hydrochloric acid at a room temperature to produce a cerium mixture solution, which is the precursor solution. On the other hand, a basic solution was prepared by loading 15 g of deionized water into 40.550 ml of ammonia in a container under an inert atmosphere, followed by stirring at 700 rpm. While maintaining the pH value of the basic solution in the container at or above 9, the prepared cerium mixture solution (precursor solution) was slowly introduced therein over a period of 30 minutes or less. Once all of the cerium mixture solution was introduced in the basic solution, the resulting mixture was stirred under an inert atmosphere at 700 rpm for 10 minutes. Then, the reaction was driven to completion by adjusting the pH of the mixture inside the container to be acidic at pH 4 or below. The completely reacted mixture was then filtered through a membrane filter having the pore size of 3 KDa (Kilo Dalton), and washed with deionized water a few times and redispersed therein, to produce the abrasive ceria particles. The produced ceria particles were found to have an average particle diameter around 5 nm.

Since the preparation process for the slurries of Experimental Examples is not so different from the preparation process for common slurry, it will be discussed briefly. First, in a container suitable for slurry preparation, a desired amount of deionized water (DI Water) and a certain measured amount of the ceria particles synthesized above as abrasive particles (abrasives) were placed and mixed to uniform consistency. Also, the pH was adjusted by adding nitric acid in the container as a pH adjustment agent. Addition and mixing of these compounds may be carried out in any order. In Experimental Examples, the ceria particles were added so that the ceria particles were contained in 1 wt % of the total weight of the slurry, and the pH thereof was maintained at 6. Other than those compounds discussed above, some incidental impurities may be present therein.

As the abrasive particles in Comparative Examples, the ceria particles prepared by a conventional wet process having a size of a few tens of nanometers were used. In other words, the abrasive particles of Comparative Examples, were obtained using a cerium precursor and by thermal treatment at approximately 85° C. Here, the particle size was controlled by controlling the number of additions of the precursor solution and the duration of thermal treatment. Slurries were prepared using each of the ceria particles having an average particle diameter of 20 nm (Comparative Example 1), 40 nm (Comparative Example 2), 70 nm (Comparative Example 3). The slurries were prepared by the same method as in Experimental Examples, and prepared so that each of the slurries contain 1 weight % of the ceria particles based on the total weight of each slurry, and the pH value thereof was adjusted to 6.

Also, dielectric layers were polished using the slurries in Experimental Examples and Comparative Examples, and the formation of scratches was observed. First, wafers to perform polishing of were prepared. That is, a number of wafers were prepared, which are silicon wafers with polysilicon layer (poly-Si) and silicon dioxide layer ($SiO_2$) deposited on its surface in a thickness of 3000 Å and 5000 Å, respectively. As a polishing apparatus, a poli-300 from G&P Tech. Inc. was used, and as polishing pads, CMP pads from Rohm & Haas were used. Also, each of the silicon dioxide wafers was polished for 60 seconds under the polishing parameters as follows. The head pressure was 193 g/cm$^3$, the speeds of spindle table and carrier were 93 rpm and 87 rpm respectively, and the pump speed (flow rate of the slurry) was 100 ml/min.

FIG. 5 is a table showing the results of polishing dielectric layers using the slurries in Experimental Examples and Comparative Examples. As shown in the table, when the polishing parameters, and the polishing amount of silicon dioxide layer were kept constant, the slurries in Comparative Examples were found to generate a great number of large scratches. Also, although the decreasing size of abrasive particles through Comparative Examples was found to reduce the size and number of scratches, the degree of scratch reduction was not sufficient and a good number of large scratches were still generated. On the other hand, using the slurries in Experimental Examples was found to significantly reduce the number of scratches, and the size of the generated scratches was notably smaller, compared to those in Comparative Examples. Accordingly, the slurries in Experimental Examples may improve, when utilized in the manufacture of semiconductor devices of fine design rules, not only performance characteristics and reliability of the devices, but also productivity of the device manufacturing process.

In accordance with an embodiment, ultra-fine abrasive particles can be easily fabricated through a simple fabricating process without raising or lowering of temperature. Also, even with no thermal treatment following the fabrication, abrasive particles with excellent crystallinity can be fabricated. Also, a slurry for CMP can be prepared using these abrasive particles.

In accordance with an embodiment, a slurry containing ultra-fine abrasive particles fabricated by a wet precipitation process can suppress the occurrence of polishing scratches, and suppress or prevent a problem of abrasion or pits on the surfaces of workpieces or etching stop layers.

In other words, in accordance with an exemplary embodiment, round-shaped fine abrasive particles synthesized using precursors which are different from each other can significantly reduce the number of scratches caused by the sharp facets of polyhedrons of conventional abrasive particles. Also, the abrasive particles in accordance with an exemplary embodiment are ultra-fine particles of a size of a few nanometers and also crystalline particles, and thus can suppress damage or formation of pits on the workpiece while maintaining polishing rate.

Also, the slurry in accordance with an exemplary embodiment can precisely polish dielectric layers such as $SiO_2$ layers with almost no scratch or damage of any kind. Utilizing these slurries in the manufacture of various devices having fine design rules may improve performance characteristics and reliability of the semiconductor devices and an overall productivity of the device manufacturing process as well.

Although the inventive concept of the present disclosure has been described with reference to the specific embodiments, they are not limited thereto. Therefore, it will be readily understood by those skilled in the art that various modifications and changes can be made thereto without departing from the spirit and scope of the present disclosure defined by the appended claims.

What is claimed is:

1. A method of fabricating abrasive particles, the method comprising:
   preparing a precursor solution in which a first precursor is mixed with a second precursor that is different from the first precursor;
   preparing a basic solution;
   mixing the basic solution with the precursor solution and forming a precipitate; and
   washing abrasive particles synthesized by precipitation;
   wherein said preparing a precursor solution comprises:
   mixing the first precursor with water to prepare a first precursor solution;
   mixing the second precursor with water to prepare a second precursor solution;
   adding an acidic material to the second precursor solution; and thereafter, mixing the first precursor solution with the second precursor solution; and wherein mixing the first precursor solution with the second precursor solution comprises adjusting a mixing ratio of the first precursor solution to the second precursor solution in a range of 1:1 to 1:5.

2. The method of claim 1, wherein the first precursor comprises an organic salt containing a cerium (III), and the second precursor comprises an inorganic salt containing the cerium (III).

3. The method of claim 2, wherein the second precursor comprises a halogen group element.

4. The method of claim 1, wherein the first precursor solution is a solution having a pH value lower than that of the second precursor solution.

5. The method of claim 1, wherein forming the precipitate is carried out while a pH of a mixture solution of the basic solution and the precursor solution is maintained at 8 to 10.

6. The method of claim 5, comprising adjusting the pH of the mixture solution to an acidic range after forming the precipitate.

7. The method of claim 6, comprising stirring the mixture solution of the basic solution and the precursor solutions prior to adjusting the pH to an acidic range.

8. The method of claim 1, wherein the first precursor comprises at least one of cerium acetate, cerium carbonate, and cerium oxalate, and the second precursor comprises at least one of cerium chloride, cerium bromide, cerium iodide, cerium sulfate, and cerium nitrate.

9. The method of claim 1, wherein forming the precipitate is carried out at a room temperature, and after forming the precipitate, no additional thermal treatment is carried out.

10. The method of claim 9, wherein the synthesized abrasive particles have an average particle diameter in a range of 2 nm to 10 nm.

11. The method of claim 10, wherein the synthesized abrasive particles comprise ceria particles.

12. The method of claim 1, wherein the precursor solution is mixed with the basic solution to form the precipitate by adding the precursor solution to the basic solution over 1 to 4 hours at room temperature.

13. A method of fabricating abrasive particles, the method comprising:

preparing a precursor solution in which a first precursor is mixed with a second precursor that is different from the first precursor;

preparing a basic solution;

mixing the basic solution with the precursor solution and forming a precipitate; and washing abrasive particles synthesized by precipitation;

wherein said preparing a precursor solution comprises:

mixing the first precursor with water to prepare a first precursor solution;

mixing the second precursor with water to prepare a second precursor solution;

adding an acidic material to the second precursor solution; and thereafter, mixing the first precursor solution with the second precursor solution;

wherein the first precursor comprises an organic salt containing a cerium (III), and the second precursor comprises an inorganic salt containing the cerium (III);

wherein the pH of the second precursor solution is adjusted to prevent the cerium (III) transforming into cerium (IV).

* * * * *